(12) United States Patent
Di Lullo Arias et al.

(10) Patent No.: US 6,491,099 B1
(45) Date of Patent: Dec. 10, 2002

(54) VISCOUS FLUID APPLICABLE FOR TREATING SUBTERRANEAN FORMATIONS

(75) Inventors: Gino F. Di Lullo Arias, Caracas (VE); Philip Rae, Singapore (SG); Atikah J. K. Ahmad, Singapore (SG)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 09/783,451

(22) Filed: Feb. 14, 2001

Related U.S. Application Data

(60) Provisional application No. 60/185,774, filed on Feb. 29, 2000.

(51) Int. Cl.⁷ .............................................. E21B 43/26
(52) U.S. Cl. .................. 166/300; 166/308; 507/244; 507/265; 507/267; 507/277; 507/904; 507/922
(58) Field of Search ................................ 166/280, 300, 166/308; 507/244, 247, 265, 267, 277, 904, 922

(56) References Cited

U.S. PATENT DOCUMENTS

| | | | | |
|---|---|---|---|---|
| 3,042,612 A | * | 7/1962 | Roebuck et al. | 507/244 X |
| 3,218,351 A | * | 11/1965 | Jolly | 507/244 X |
| 3,361,213 A | | 1/1968 | Savins | |
| 3,924,685 A | * | 12/1975 | Tate | 166/308 |
| 4,007,792 A | | 2/1977 | Meister | 166/308 |
| 4,061,580 A | | 12/1977 | Jahnke | |
| 4,071,457 A | | 1/1978 | Meister | |
| 4,120,356 A | | 10/1978 | Meister | 166/267 |
| 4,148,736 A | | 4/1979 | Meister | |
| 4,195,977 A | | 4/1980 | Newman | 44/71 |
| 4,582,137 A | | 4/1986 | Schmitt | |
| 4,591,447 A | | 5/1986 | Kubula | |
| 4,615,825 A | | 10/1986 | Teot et al. | |
| 4,695,389 A | | 9/1987 | Kubala | |
| 4,725,372 A | | 2/1988 | Teot et al. | |
| 4,735,731 A | | 4/1988 | Rose et al. | |
| 4,796,702 A | * | 1/1989 | Scherubel | 166/308 |
| 4,806,256 A | | 2/1989 | Rose et al. | 252/71 |
| 4,929,341 A | | 5/1990 | Thirumalachar et al. | 208/390 |
| 4,960,527 A | | 10/1990 | Penny | |
| 5,036,136 A | | 7/1991 | Peiffer | 524/812 |
| 5,093,448 A | | 3/1992 | Peiffer | 526/310 |
| 5,101,903 A | | 4/1992 | Llave et al. | 166/294 |
| 5,164,118 A | | 11/1992 | Sauer et al. | 252/356 |
| 5,242,615 A | | 9/1993 | Urfer et al. | 252/174.17 |
| 5,258,137 A | | 11/1993 | Bonekamp et al. | 252/356 |
| 5,551,516 A | | 9/1996 | Norman et al. | 166/308 |
| 5,955,412 A | | 9/1999 | Post et al. | 510/247 |
| 5,964,295 A | | 10/1999 | Brown et al. | 166/308 |
| 5,979,555 A | | 11/1999 | Gadberry et al. | 166/270.1 |
| 5,979,557 A | | 11/1999 | Card et al. | 166/300 |
| 6,069,118 A | | 5/2000 | Hinkel et al. | 507/277 |
| 6,140,277 A | | 10/2000 | Tibbles et al. | 507/201 |
| 6,194,356 B1 | | 2/2001 | Jones et al. | 507/225 |

FOREIGN PATENT DOCUMENTS

| | | |
|---|---|---|
| CA | 1298697 | 4/1992 |
| CA | 2217659 | 5/2001 |
| WO | WO 94/09852 | 5/1994 |
| WO | WO 99/24693 | 5/1999 |
| WO | WO 99/50529 | 10/1999 |
| WO | WO 99/50530 | 10/1999 |

* cited by examiner

*Primary Examiner*—George Suchfield
(74) *Attorney, Agent, or Firm*—Bracewell & Patterson, LLP

(57) ABSTRACT

A viscous fluid is shown which is useful in treating subterranean formations. The fluid is formulated from an aqueous base, an alkyl sarcosinate surfactant and a buffer suitable for adjusting the pH of the blended fluid to a range in which the fluid is suitably viscosified. The fluid can also include an additional source of anions, such as chloride or fluoride ions, in order to increase the temperature stability of the fluid. The fluids have application for conventional well fracturing, coiled tubing fracturing, gravel packing and frac packing, as well as for use as selective water control additives and other applications.

10 Claims, No Drawings

VISCOUS FLUID APPLICABLE FOR TREATING SUBTERRANEAN FORMATIONS

CROSS-REFERENCE TO ELATED APPLICATION

Benefit is herein claimed of the filing date under 35 U.S.C. §§119 and/or 120, and 37 CFR §1.78 to United States Provisional Patent Application Ser. No. 60/185,774, filed on Feb. 29, 2000, entitled "VISCOUS FLUID APPLICABLE FOR TREATING SUBTERRANEAN FORMATIONS".

BACKGROUND ART

1. Field of the Invention

This invention relates to the art of treatment fluids used in the recovery of hydrocarbon fluids from subterranean formations, and more particularly, to a fracturing fluid and method of fracturing a hydrocarbon-bearing formation.

2. Description of Related Art

Where hydrocarbons are being recovered from subterranean formations, it is common, particularly in formations of low permeability, to hydraulically fracture the hydrocarbon-bearing formation to provide flow channels to facilitate production of the hydrocarbons to the wellbore. Fracturing fluids typically comprise a thickened base fluid which primarily permits the suspension of particulate proppant materials in the fluid. Typical proppant materials include sand, sintered bauxite and the like. These materials will remain in place within the fracture when fracturing pressure is released thereby holding the fracture open. Such thickened fluids also aid in the transfer of hydraulic fracturing pressure to the rock surfaces and help to control leak-off of the fracturing fluid into the formation.

For many years, the most commonly used fracturing fluids comprised polymer thickened base fluids. The thickening polymers utilized were typically galactomannan gums, cellulosic polymers or synthetic polymers. It was generally necessary to cross-link the hydrated polymers in order to increase the viscosity and, thus, the proppant carrying capacity as well as to increase high temperature stability of the fracturing fluids. Typical cross-linking agents were borates or soluble organo metallic salts. Cross-linking or tying together of the polymer chains increases the viscosity and improves the rheology of the fracturing fluid.

In order to reduce the pumping friction pressure in such fluids, various methods of delaying cross-linking of the polymers have been developed. Delayed cross-linking allows the pumping of a relatively less viscous fracturing fluid having relatively low friction pressures within the well tubing. Cross-linking is then effected at or near the subterranean formation so that the previously mentioned advantages of the thickened cross-linked fluids are available downhole.

One disadvantage of the polymer thickened fluids was the necessity to hydrate the polymer at the well surface in a batch mix operation for several hours in a mixing tank or other container. It was often necessary to cross-link the polymer over a period of time to viscosify the fluid so that it is capable of carrying the proppant into the fracture. Natural polymers including polysaccharides, such as guar, have been used in this way in the past.

The hydration and cross-linking steps were time consuming and required expensive and bulky equipment at the wellsite. Such equipment, and the associated personnel to operate it, significantly increase the cost of the fracturing operation. Further once the polysaccharide is hydrated and crosslinked, it is generally not feasible to add additional polysaccharide to the solution, or to regulate the concentration of polysaccharide in the fracturing fluid during the pumping of the job.

The polymer based fluids of the type described also typically required a large number of additives in addition to the polymer, for example: bactericides, antifoam agents, surfactants to aid dispersion, pH control agents, chemical breakers, enzymatic breakers, iron control agents, fluid stabilizers, antioxidants, salts and the like. These materials must be formulated correctly, transported to the jobsite, and then pumped and metered accurately during the execution of the fracturing treatment.

Another difficulty with polymer-thickened fluids is the deposit and retention of polymer residues at the rock face and within the proppant pack. These characteristics can reduce the effectiveness of the fracturing operation. While there have been significant advancements in the use of oxidative or other breaker systems to reduce the effects of a polymer filter cake and other polymer residue within the fracture, such methods are always less than completely effective.

For example, during the course of a treatment, water from the fracturing fluid may leak into the formation leaving the polymer thickener behind. Concentrations of polysaccharide thickeners, such as guar, show dramatic increases as a factor of twenty as compared to the concentration of guar in the actual fracturing fluid. Many fracturing fluid materials, therefore, when used in large concentrations, have relatively poor "clean-up" properties, meaning that such fluids undesirably reduce the permeability of the formation and proppant pack after fracturing the formation. Well productivity after fracturing increases dramatically as the amount of polysaccharide returned to the surface increases.

One means of overcoming the effects of polymer residues remaining within a fracture would be to use a fracturing fluid that has components that allow themselves to associate, forming structures that are responsible for dramatically increasing the viscosity of the fluid. After the pumping into the fracture is completed, conditions within the fracture and fluid change, resulting in the loss of structure and consequently, viscosity. Example components capable of forming associating structures are certain surfactants. Thus, various emulsions of water and oil have been proposed. These surfactants, under specific conditions, can associate with one another to produce viscosified fluids having properties similar to polymer based fluids. Changes in pH or hydrocarbon content can then dramatically reduce viscosity without the need of traditional breakers and clean-up can occur unhindered due to the lack of proppant pack residue.

While structured surfactant based fluids offer certain advantages over traditional polymer based fluids, there remains room for improvement. These surfactant based fluids have tended to utilize expensive surfactants which were cost prohibitive in some instances. Cost limitations have resulted in the design of these structured fluids that can be characterized as marginal fracturing fluids. There have also been limitations on the temperature stability of such fluids, limiting treatment sizes to rather small fracturing treatments.

U.S. Pat. No. 5,964,295, issued Oct. 12, 1999, to Brown, et al., teaches a method and composition for treating subterranean formations utilizing a "viscoelastic fluid" which purports to overcome certain of the above-noted deficiencies of the prior art polymer containing fluids. However, the Brown fluid continues to be subject to temperature and stability limitations and forms emulsions which are oil wetting to the formation.

BRIEF SUMMARY OF THE INVENTION

An object of the present invention is to develop a surfactant based fluid with the ability to suspend proppants that is economical, having superior properties compared to existing product available on the market, as well as being more temperature tolerant.

The viscous fluids of the invention can be used for transporting particulate through a conduit to a subterranean location. In one form, the fluids comprise an aqueous base, a surfactant comprising an alkyl sarcosinate having from 12 to 24 carbon atoms and a buffer for adjusting the pH of the combined aqueous base and surfactant at or for the formation pH. The alkyl sarcosinate is preferably present in the range from about 0.5 to 10% by weight, based upon the weight of the total fluid. The pH of the viscous fluid is preferably adjusted with the buffer to be in the range from about 6.5 to 10.0 for most formations.

The viscous fluids of the invention can also include an additional source of anions in addition to those furnished by the surfactant. The additional source of anions can comprise a carboxylic acid salt present in the range from about 0.1 to 2% by weight, based upon the weight of the total fluid. The carboxylic acid salt, if present, is preferably selected from the group consisting of monovalent acetates, divalent fumerates, trivalent citrates and tetravalent EDTA. Alternatively, the additional source of anions comprises a source of chloride or fluoride ions. The preferred source of chloride ions are inorganic salts such as ammonium chloride and potassium chloride. The preferred sources of fluoride ions can comprise a fluoride salt or acid compound present in the range from about 0.5 to 10% by weight, based upon the weight of the total fluid. The most preferred sources of fluoride ions are inorganic fluoride salts selected from the group consisting of ammonium bifluoride and sodium or potassium fluoride or a fluoride acid such as fluosilicic acid. Where the additional source of anions comprises a source of fluoride ions, the viscous fluid contains a buffer to adjust the pH of the resulting viscous fluid within the range from about 6.5 to 10.

In the method of fracturing a subterranean formation of the invention, an aqueous base fluid is combined with a surfactant comprising an alkyl sarcosinate having from 12 to 24 carbon atoms. The combined fluid is buffered to thereby adjust the pH of the combined aqueous base and surfactant at or for the formation pH, thereby creating a viscous fluid capable of supporting proppant. The viscous fluid is pumped through a wellbore and into a surrounding formation at a pressure sufficient to fracture the formation.

The viscous fluids of the invention can also be used in a method for reducing the amount of water produced from a subterranean oil producing formation. An aqueous base fluid is combined with a surfactant comprising an alkyl sarcosinate having from 12 to 24 carbon atoms as before. The combined fluid is buffered to thereby adjust the pH of the combined aqueous base and surfactant sufficiently to produce a viscous fluid. The viscous fluid is pumped through a wellbore and into a surrounding formation having an aqueous zone and a hydrocarbon zone, the aqueous zone comprising water. The viscous fluid is then allowed to contact the aqueous zone and the hydrocarbon zone. Contact with the hydrocarbon zone serves to thin the viscous fluid while contact with the aqueous zone serves to preferentially block the flow of water from that portion of the formation.

Additional objects, features and advantages will be apparent in the written description which follows.

DETAILED DESCRIPTION OF THE PREFERRED EMBODIMENT

The present invention is a new viscous fluid which is particularly useful in transporting particulate through a conduit. The viscous fluid of the invention has application for conventional well fracturing, coiled tubing fracturing, gravel packing and frac packing, as well as for use as a selective water control additive.

The viscous fluids of the invention, unlike conventional polymer based viscous fluids, are based upon surfactant compositions. In a preferred form, the viscous fluids of the invention comprise at least an aqueous base, a surfactant comprising an alkyl sarcosinate having from about 12 to 24 carbon atoms in the alkyl group and a buffer for adjusting the pH of the combined aqueous base and surfactant at or for the formation pH. In other words, the optimum pH for the system is the formation pH. As will be explained in detail, the fluids of the invention are optimized for viscosity and for the formation pH in order to reduce ion exchange at the formation, thereby avoiding clay dispersion and swelling. The water used in formulating the fluids can be fresh water or light brines from any convenient source. The particularly preferred alkyl sarcosinates used as the surfactant have an alkyl group ranging from 14 to 18 carbon atoms.

Sarcosine is a naturally occurring amino acid. It can be produced by thermal decomposition of caffine in the presence of barium carbonate. Sodium sarcosinate is manufactured commercially from formaldehyde, sodium cyanide and methyl amine. The preferred sarcosinates are the condensation products of sodium sarcosinate and a fatty acid chloride. The fatty acid chloride is reacted with sodium sarcosinate under alkaline conditions to produce the fatty sarcosinate sodium salt, which is water soluble. Upon acidification, the fatty sarcosine acid, which is water insoluble, is formed and may be isolated from the reaction medium. The acyl sarcosines may be neutralized with bases such as sodium, potassium, ammonia, or triethanolamine to produce aqueous solutions. The preferred sarcosinates of the invention can be represented structurally as:

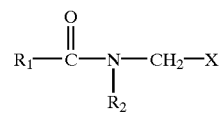

wherein $R_1$ is a fatty acid hydrocarbon chain having from 12 to 24 carbon atoms, $R_2$ is selected from the group consisting of hydrogen, methyl, propyl, butyl and ethyl and X is selected from the group consisting of carboxyl and sulfonyl.

The particular surfactant selected for use in the method of the invention is an anionic sarcosinate surfactant available commercially from BJ Services Company of Tomball, Tex., as "MA-1." The MA-1 sarcosinate is a viscous liquid surfactant with at least 94% oleoyl sarcosine. For hydraulic fracturing, a sufficient quantity of the sarcosinate is present in aqueous solution to provide sufficient viscosity to suspend proppant during placement. The surfactant is preferably present in the range from about 0.5 to 10% by weight, most preferably from about 0.5 to 6% by weight, based upon the weight of the total fluid. Laboratory procedures are employed to determine the optimum concentrations for any particular job.

As will be explained in the laboratory evaluations, to prepare the aqueous hydraulic fracturing fluids of the invention, the surfactant is added to an aqueous solution in which there is typically dissolved a quantity of at least one water soluble salt to effect formation stability. Typical water soluble salts include potassium chloride, sodium chloride and the like. Formation stability is typically achieved with only small concentrations of salt. The water soluble salts may be considered part of the "buffer" for adjusting the pH of the combined aqueous base and surfactant in the method of the present invention. Other salts/buffer combinations can also be used, for example, ammonium or potassium persulfates can be used at pH between about 6.0 to 8.0 on gravel pack jobs or in filter cake removal jobs where a polymer based drill fluid was utilized. For sand or proppant clean out treatments, NaCl/NaOH combinations can be utilized at pH ranges from about 6.0 to 8.0. For treatments requiring a pH lower than about 7.0, potassium citrate has been successfully employed.

The viscosity of the fluids of the invention are improved significantly by the addition of certain additional anions to the surfactant-laden solution. These anions can be carboxylic salts such as monovalent acetate, divalent fumerate, trivalent citrate or tetravalent ethylenediaminetetraamine (EDTA). Typically the concentration of these salts ranges from about 0.1 to 2% by weight, based upon the weight of the total fluid and the pH of the solution is adjusted above about 6.5. The pH can be adjusted, for example, by the addition of alkali metal or ammonium ions of hydroxide, carbonate, phosphate or borate, or organic amines, especially alkanol amines such as mono, di or tri ethanolamine.

High temperature stability of the fluids in question is achieved if the source of additional anions is a source of chloride or fluoride ions preferably provided in the form of an inorganic chloride or fluoride salt or a fluoride acid such as fluosilicic acid. When the preferred fluoride salts are substituted for the carboxylic acid salts or supplemented with the carboxylic salts, significant improvements in temperature stability were observed. The fluoride salt concentration can range from about 0.5 to 10%, with the most preferred range being from about 3 to 6% by weight, based upon the total weight of the fluid. Typical fluoride salts include ammonium bifluoride and sodium and potassium fluoride and the pH of the surfactant-fluoride salt solution is adjusted to range from about 6.5 to 10. The pH can be adjusted with the same bases as discussed above.

Each salt will produce a peak viscosity at a different pH. The fluids of the invention are optimized for viscosity and formation pH as will be discussed with respect to the laboratory analyses which follow.

In addition to the surfactant, water soluble salts and additional sources of anions discussed above, the formulations of the invention can also contain other conventional additives which perform specific functions such as, e.g., corrosion inhibitors, fluid-loss additives, scale inhibitors and others. The proppant can then be suspended in the fluid. Conventional proppants will be familiar to those skilled in the art and include sand, resin coated sand sintered bauxite and similar materials.

The fluids of the invention are easily degraded by contamination with hydrocarbon based fluids naturally present in the reservoir or by a decline in the pH of the fluid so that an additional breaker compound is generally not necessary in the fluid being pumped. The pH decline is often observed in sandstone formations or by aqueous formation fluids, for example.

In the method of fracturing a formation using the formulations of the invention, an aqueous base fluid is combined with a surfactant comprising an alkyl sarcosinate having from 12 to 24 carbon atoms. Standard mixing procedures known in the art can be employed since heating of the solution or special agitation procedures are not normally required. The aqueous base has been buffered with a buffer to thereby adjust the pH of the combined aqueous base and surfactant above about 6.5, thereby creating a viscous fluid capable of supporting proppant. The proppant can be added and the viscous fluid can then be pumped through a wellbore and into a surrounding formation at a pressure sufficient to fracture the formation. Typically, the viscous fluid can be allowed to contact the formation for a period of time sufficient to break the fluid viscosity without the use of additional breaker materials.

The fluid of the invention can also be used as selective water control additives. The viscous fluids can be pumped into a water rich sector of a producing interval. Once placed, the gel viscosity will prevent formation water flow through that portion of the reservoir. On the other hand, gel pumped into the oil rich sector of the formation reservoir will immediately thin on contact with the oil contained within the reservoir. Consequently, oil production will be uninhibited while water flow will be preferentially stopped.

For fracturing applications, the fluids of the invention are typically pumped downhole at or slightly above the formation pH. Preferably, when the fluids of the invention are used for water control purposes, the fluids are pumped downhole at about $3/10$ of a pH unit less than the formation material pH. The fluid is thus pumped in a thinned state, reducing the friction pressure of the pumping job. Upon contacting the formation material, the pH of the fluid moves up, resulting in gellation of the fluid at the formation location rather than at the well surface.

In order to more fully describe the fracturing fluids of the invention, the following examples are set forth. However, it is to be understood that the examples are not intended to limit the scope of the present invention as defined in the appended claims.

Each of the components of the viscous fluids of the invention is readily soluble in water or light brines at pH higher than 4.5. The fluid is easily prepared in mixing equipment that allows circulation or agitation, i.e. blenders, tanks equipped with augers or tanks that are connected to a circulating pump, such as an acid transport trailer or in displacement tanks of cementing units.

A preferred mixing procedure is as follows:

1. Load the fresh water necessary to prepare the desired volume of viscous fluid into a clean tank.
2. While agitating or circulating, slowly add and dissolve the required amount of the salt, for example, KCl, KF, $NH_4Cl$ and or ABF.

The salt concentration will depend on the type of salt used and the final pH, as part of the "additional anions" requirement for optimum viscosity as discussed above. The following table can be used as a guideline. Unless otherwise stated, the percentages are by weight of total fluid solution.

| Salt Type | Minimum Concentration Required for Viscous Fluid | Optimum Concentration Range for Viscous Fluid | Optimum pH Range |
| --- | --- | --- | --- |
| KCl | 6% | 11–12% | 7.3–8.5 |
| $NH_4Cl$ | 2% | 3–5% | 7–8.5 |
| KF | 5% | 6.5–8% | 8–10 |
| ABF | 1.5% | 2.5–3% | 8–9.5 |

3. Add the required volume of pH adjuster/buffer solution.
4. Add the MA-1 and mix slowly mix (to avoid foam) for 5–10 minutes or until it disperses well to produce a uniform linear gel.
5. Add the remainder of the buffer for completed activation and full viscosity development.

In the case of KF, the anionic surfactant is supplied in the acid form is not soluble in field water. The pH of the water in the mixing tank must be alkaline enough before the addition of MA-1, so that when the MA-1 is added, the pH is at least above 4.5 and preferentially above 7.0. This buffering of the mixing water will prevent waxing out of the surfactant and speeds the mixing process. Usually with field water, the addition of 40% solution of base such as KOH at one-half of the concentration of MA-1 will neutralize the pH of the mixing water when the MA-1 is added.

In the case of systems utilizing ABF as the additional source of anions, for every 1% of ABF, an additional 0.5% of the buffer is generally required. In any case, the optimum pH for the system is the formation pH. As increases in temperature reduce the pH it is recommended that the final pH be one pH unit higher for KOH systems or ½ unit higher when most other buffer systems are used. This can be done in the mixing tank or on the fly at the blender.

The tables below are examples of the viscosity optimization process using 4% MA-1 (sarcosinate surfactant) for a target formation pH of 8.0 using KCl and KF with field water. The BF-7L is a commercially available buffer commonly used in the formulation of fracturing fluids. It can be obtained commercially from BJ Services Company of Tomball, Tex.

Example Using KCl
Formation pH: 8.0 @ 180° F.; design for a pH of 8.5 to 9.0 at the well surface.
Fluid viscosity requirements=200 cps @ 180° F. & 40 sec$^{-1}$
For KCl Determination

| 4% MA-1 + 2.0% BF-7L | KCl % by weight | pH gel @ 80° F. + 0.4% BF-7L | Viscosity @ 40 sec & 80° F., CPS |
|---|---|---|---|
| 4% MA-1 + 2.0% BF-7L | 10 | 8.5 | 1281 |
| 4% MA-1 + 2.0% BF-7L | 11 | 8.6 | 1565 |
| 4% MA-1 + 2.0% BF-7L | 12 | 8.6 | 1708 |
| 4% MA-1 + 2.0% BF-7L | 13 | 8.7 | 1512 |

The 12% KCl system produced 285 cps @ 40 sec-1 & a pH of 8.2 when tested @180° F., therefore a system with 3.5% MA-1 may be sufficient for this treatment.

Example Using KF
Formation pH: 8.0 @ 180° F.; design for 8.5 to 9.0 at the well surface.
Fluid viscosity requirements=200 cps @ 40 sec$^{-1}$
For KF Determination

| 4% MA-1 + 2.0% BF-7L | KF % by weight | pH gel @ 80° F. + 0.4% BF-7L | Viscosity @ 40 sec & & 80° F., CPS |
|---|---|---|---|
| 4% MA-1 + 2.0% BF-7L | 7 | 8.91 | 1424 |
| 4% MA-1 + 2.0% BF-7L | 8 | 8.95 | 2277 |
| 4% MA-1 + 2.0% BF-7L | 9 | 8.96 | 996 |

The 8% KF system produced 452 cps @40 sec-1 and a pH of 8.6 when tested @ 180° F., therefore a system with 3% MA-1 may be sufficient for this treatment.

As indicated in the above examples, the formulations utilizing KF produce about twice the viscosity of similar formulations that contain KCl. However, KF is not available in all geographic locations. The following formulations utilize ABF and KOH in order to produce KF in solution. Because the formulations are mixing cations (potassium and ammonium) it is more difficult to optimize the viscosity and pH. The following examples illustrate systems for four different concentrations of MA-1 and for a fixed pH of 9.0 to 9.5 depending on the pH of local water. When the solutions are heated as they are pumped downhole, the pH will drop to around 8.5 to 9 depending on bottom hole injecting temperature.

EXAMPLE 1

The following ingredients were added to the water in the mixing tank:
KOH 3.0%
ABF 2.75%
MA-1 1%

The pH was approximately 8.5 with the formulation becoming viscous. If required, the pH can be further adjusted by addition of KOH.

Next, a 40% KOH solution was utilized to adjust the final pH to approximately 9.5. The amount of KOH utilized was approximately 0.25% by weight of total solution.

The following properties of the fluid were observed: Apparent Viscosity at 100 sec$^{-1}$=150 cps and A. Viscosity at 40 sec$^{-1}$=300 cps, both at 80 F.

EXAMPLE 2

The same procedures were employed.
KOH 3.25%
ABF 2.75%
MA-1 2%
Apparent Viscosity at 100 sec$^{-1}$=350 cps and A. Viscosity at 40 sec$^{-1}$=700 cps, both at 80F.

EXAMPLE 3

KOH 3.75%
ABF 2.75%
MA-1 3%
Apparent Viscosity at 100 sec$^{-1}$=600 cps and A. Viscosity at 40 sec$^{-1}$=1500 cps, both at 80 F.

EXAMPLE 4

KOH 4.25%
ABF 2.75%
MA-1 4%
Apparent Viscosity at 100 sec$^{-1}$=1000 cps and A. Viscosity at 40 sec$^{-1}$=3100 cps, both at 80 F.

As shown above, the viscosity (at 40 sec$^{-1}$) generally doubles for every additional percent of MA-1. The preferred range of MA-1 for these systems is from about 2.5% to 3% by weight of total solution, most preferably about 2.75% by weight.

An invention has been provided with several advantages. The fluids of the invention have the ability to suspend proppant for hydraulic fracturing operations and yet possess superior cleanup possibilities since no polymer is utilized in the fluids. The fluids can also be used for gravel pack jobs, filter cake removal, sand or proppant clean out jobs, for water control purposes and for other applications. The fluids are economical to produce and offer superior properties as compared to existing products available in the market. The fluids are more temperature tolerant than previously available surfactant based systems. The KCl systems described above can generally be utilized for temperatures up to about 230° F. with the KF systems being useful up to about 260° F. Because no polymers are necessary in the formulations, the fluids of the invention are generally not affected by the shearing action that may result from mixing or pumping. The fluids also exhibit reduced friction pressures during pumping.

It should be apparent from the foregoing that an invention having significant advantages has been provided. While the invention is shown in a limited number of forms, it is not limited to just these forms, but is susceptible to various changes and modifications without departing from the spirit thereof.

We claim:

1. A method of fracturing a subterranean formation, the method comprising the steps of:
   combining an aqueous base fluid with a surfactant comprising an alkyl sarcosinate having from 12 to 24 carbon atoms;
   buffering the combined fluid with a buffer to thereby adjust the pH of the combined aqueous base and surfactant above about 6.5, thereby creating a viscous fluid capable of supporting proppant;
   pumping the viscous fluid through a wellbore and into a surrounding formation at a pressure sufficient to fracture the formation.

2. The method of claim 1, further comprising the steps of:
   allowing the viscous fluid to contact the formation for a period of time sufficient to break the fluid viscosity without the use of additional breaker materials.

3. A method of fracturing a subterranean formation, the method comprising the steps of:
   combining an aqueous base fluid with a surfactant comprising an alkyl sarcosinate having from 12 to 24 carbon atoms;
   adding a source of chloride or fluoride ions to the combined fluid;
   buffering the combined fluid with a buffer to thereby adjust the pH of the combined aqueous base and surfactant within the pH range from about 6.5 to 10, thereby creating a viscous fluid capable of supporting proppant;
   pumping the viscous fluid through a wellbore and into a surrounding formation at a pressure sufficient to fracture the formation.

4. The method of claim 3, wherein the source of fluoride ions is a fluoride salt or acid compound present in the range from about 0.5 to 10% by weight, based upon the weight of the total fluid.

5. The method of claim 3, wherein a source of fluoride ions is added to the combined fluid, and wherein the source of fluoride ions is selected from the group consisting of ammonium bifluoride, sodium fluoride, potassium fluoride and fluoride based acids.

6. The method of claim 3, further comprising the steps of adding an additional source of anions to the combined fluid.

7. The method of claim 3, wherein the source of anions is a carboxylic acid salt present in the range from about 0.1 to 2% by weight, based upon the weight of the total fluid.

8. The method of claim 7, wherein the carboxylic acid salt is selected from the group consisting of monovalent acetates, divalent fumerates, trivalent citrates and tetravalent EDTA.

9. A method of fracturing a subterranean formation, the method comprising the steps of:
   preparing a base solution comprising an aqueous fluid which is buffered within the pH range from about 7.0–10.0;
   dispersing a surfactant comprising an alkyl sarcosinate having from 12 to 24 carbon atoms within the base solution to form a combined fluid, thereby reducing the pH of the combined fluid within the pH range from about 5.0 to 10.0;
   slowing increasing the pH of the combined fluid within the range from about 7.0 to 9.0 by adding caustic to the combined fluid to produce a viscous fluid capable of supporting a proppant;
   pumping the viscous fluid through a wellbore and into a surrounding formation at a pressure sufficient to fracture the formation.

10. The method of claim 9, further comprising the steps of:
    allowing the viscous fluid to contact the formation for a period of time sufficient to break the fluid viscosity without the use of additional breaker materials.

* * * * *

UNITED STATES PATENT AND TRADEMARK OFFICE
CERTIFICATE OF CORRECTION

PATENT NO.    : 6,491,099 B1
DATED         : December 10, 2002
INVENTOR(S)   : Di Lullo Arias et al.

It is certified that error appears in the above-identified patent and that said Letters Patent is hereby corrected as shown below:

Column 9,
Line 1, "MA-1" should read -- ABF --.

Signed and Sealed this

Seventeenth Day of June, 2003

JAMES E. ROGAN
*Director of the United States Patent and Trademark Office*